United States Patent [19]

Van Vliet

[11] Patent Number: 4,775,282

[45] Date of Patent: Oct. 4, 1988

[54] CARRIER FOR A CONVEYANCE FOR THE HANDICAPPED

[76] Inventor: George R. Van Vliet, 75 Van Ness Avenue, Little Falls, N.J. 07424

[21] Appl. No.: 912,314

[22] Filed: Sep. 29, 1986

[51] Int. Cl.⁴ .............................................. B60P 01/00
[52] U.S. Cl. ................... 414/462; 224/42.07; 224/42.43; 293/117; 414/921; 414/541
[58] Field of Search ...... 224/42.03 R, 42.07, 224/42.08, 42.43; 293/117; 414/462, 541, 556, 557, 921

[56] References Cited

U.S. PATENT DOCUMENTS

| 2,676,720 | 4/1954 | Noble | 414/462 |
|---|---|---|---|
| 3,174,634 | 3/1965 | Peck | 414/541 |
| 3,279,629 | 10/1966 | Pietroroia | 414/557 |
| 3,656,637 | 4/1972 | Lynn | 414/542 |
| 3,913,811 | 10/1975 | Spencer | 224/42.08 |
| 3,937,376 | 2/1976 | Ewing | 224/42.08 |
| 4,050,616 | 9/1977 | Mosow | 224/42.03 B |
| 4,089,542 | 5/1978 | Westerman | 280/639 |
| 4,278,389 | 7/1981 | Konkle | 414/921 X |
| 4,456,421 | 6/1984 | Robson | 414/541 X |
| 4,479,753 | 10/1984 | Thorley | 414/541 |
| 4,534,450 | 8/1985 | Savaria | 414/921 X |

Primary Examiner—Robert J. Spar
Assistant Examiner—Janice Krizek
Attorney, Agent, or Firm—Thomas L. Adams

[57] ABSTRACT

A carrier is mountable on the rear of a vehicle for carrying a conveyance for handicapped persons. The carrier has a frame adapted to be attached to the conveyance. The platform is slideably and hingeably attached to this frame. The platform is vertically positionable above the ground for storage. The carrier also includes a drive motor coupled between the frame and the platform for lifting the platform while keeping it horizontal. This driver is sized to lift the platform with it loaded with the conveyance.

25 Claims, 9 Drawing Sheets

CARRIER FOR A CONVEYANCE FOR THE HANDICAPPED

BACKGROUND OF THE INVENTION

The present invention relates to conveyance carriers, and in particular, to carriers for lifting a conveyance.

It is known to mount a conveyance to the rear of a vehicle. This platform can be folded upwardly when not in use. However, this type of platform is inconvenient to use since the conveyance must be lifted by other equipment.

It is also known to lift and tilt automatically a pallet and store it in the trunk of an automobile. The pallet can be loaded with a wheelchair so that a handicapped person can easily transport his wheelchair when using the automobile.

It is also known to employ a carrying frame pivotally mounted to the rear of a vehicle. A small conveyance can be driven onto the frame which is then hydraulically tilted up and against the rear of the vehicle. However, this apparatus only operates satisfactorily with a conveyance that is relatively short and would not be appropriate for a conveyance for handicapped persons.

Accordingly, there is the need for an improved carrier for handicapped persons that does not require a person to lift the conveyance and which can be stored out of the way when not in use.

SUMMARY OF THE INVENTION

In accordance with the illustrative embodiments demonstrating features and advantages of the present invention, there is provided a carrier that is mountable on the rear of a vehicle for carrying a conveyance for handicapped persons. The carrier has a frame, a platform, and a drive means. The frame is adapted to be attached to the vehicle. The platform is slideably and hingeably attached to the frame. This platform is vertically positionable above the ground for storage. The drive means is coupled between the frame and the platform for lifting the platform while keeping it horizontal. This drive means is sized to lift the platform with it loaded with the conveyance.

By employing apparatus of the forgoing type, an improved carrier for a handicapped person's conveyance is achieved. In a preferred embodiment, a frame is mounted to a hitch attached to the frame of an automobile. The frame supports a jackscrew that is driven by an electric motor. The jackscrew can lift a platform that is hingeably attached to the jackscrew. Thus, the jackscrew can lift the platform with a conveyance on it.

Also in a preferred embodiment, the jackscrew attaches to a crossbar having towards its outer ends, uprights that fit into guide sleeves on the frame. These guides keep the platform relatively level during lifting. This preferred embodiment has a front wheel holder mounted on the platform to keep the front wheel of the conveyance in place when on the platform. Preferably, the platform has a ramping end which allows the conveyance to be easily rolled onto the platform.

In one embodiment, the frame is attached to the vehicle at a single point. To restrict rolling motion of the platform, it has a pair of tabs that project towards the vehicle. These tabs can operate in various ways. For example, they can engage the underside of a car bumper. Alternatively, they can engage notches in specially mounted "bumperettes" so that rocking is restricted.

Also in this preferred embodiment, a "kickstand" type of lever is attached to the frame to extend over the conveyance and hold it in place.

In another embodiment, the platform is supported by a slider that can be pulled upwardly through a sleeve by means of a chain. In one embodiment, the chain is routed over a sprocket at the top of the sleeve to be fed towards a winch.

In another embodiment, the jackscrew is replaced with a hydraulic piston. The lower end of the piston is connected to a crossbar that hingeably supports the platform. In this embodiment, the crossbar has arms extending from either end of it that terminate at pivot points on the underside of the automobile, typically on the automobile frame.

BRIEF DESCRIPTION OF THE DRAWING

The above brief description as well as other features and advantages of the present invention will be more fully appreciated by reference to the following detailed description of presently preferred but nonetheless illustrative embodiments in accordance with the present invention when taken in conjunction with the accompanying drawings, wherein.

DETAILED DESCRIPTION OF THE PREFERRED EMBODIMENTS

Figure 1:
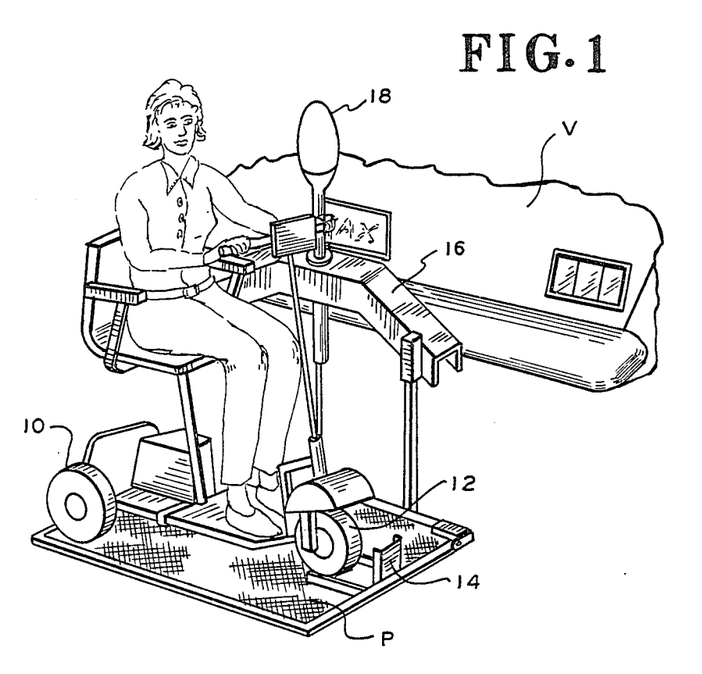
FIG. 1 is a perspective view of a carrier mounted on the rear of the vehicle according to the principles of the present invention.

Referring to FIG. 1, it shows a carrier which is mounted to the rear of a vehicle V. The carrier includes a platform P onto which a conveyance 10 is placed. In this illustration, conveyance 10 is a three wheeled, battery-powered conveyance for a handicapped person. In the position illustrated, the conveyance 10 can be readily rolled onto platform P until the front wheel 12 engages the holder 14. The carrier is shown having a frame 16 in the form of an inverted "V". The frame 16 is formed of a channel that is bent into the shape illustrated. Mounted through the top of frame 16 is a drive means, shown herein as a motor driven jackscrew 18. In one embodiment, jackscrew 18 was a "LECTRA JACK" manufactured by Reese of Elkhart, Ind., their part number 41606 (although clearly other types of power lifting devices may be employed instead).

Figure 2:
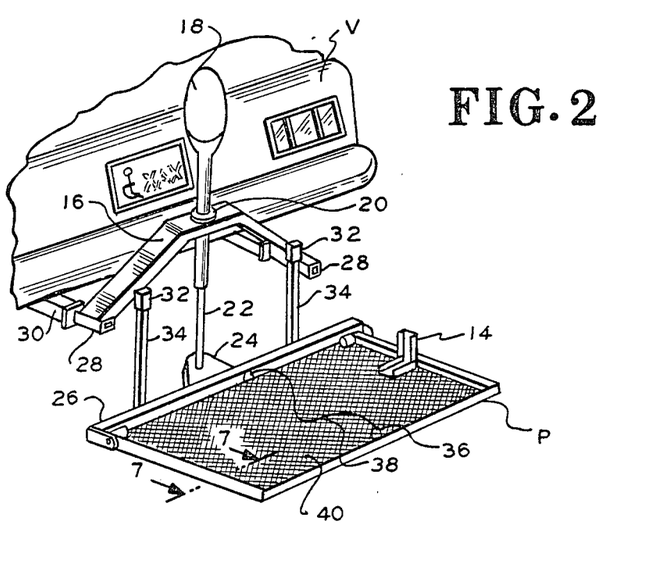
FIG. 2 is a perspective view of the carrier of FIG. 2 with the conveyance removed.

Referring to FIG. 2, it clearly illustrates that jackscrew 18 is mounted by its flange 20 to the top pedestal portion of frame 16 to extend upwardly and downwardly. A telescoping rod 22 of jackscrew 18 is shown in this embodiment, welded to a pedestal 24 which is in turn welded to a crossbar 26.

Frame 16 is a beam that has welded at either end horizontal rods 28, formed of square tube. The tubes 28 are sized to fit within receivers 30 which are in the form of a standard hitch that may be welded to an automobile frame. Welded to the exposed vertical face of frame 16 are a pair of spaced guides 32. Guides 32 are hollow rectangular sleeves sized to receive sliding uprights 34. Uprights 34 are welded to crossbar 26.

Platform P, as described hereinafter in greater detail, is hinged to crossbar 26. The platform P has a pair of eyelets 36 that can connect to a security chain 38 to hold the conveyance in place. Platform P is shown with a grating 40 used as a bed to support the conveyance. It will be appreciated however, that other beds can be used instead.

Figure 3:
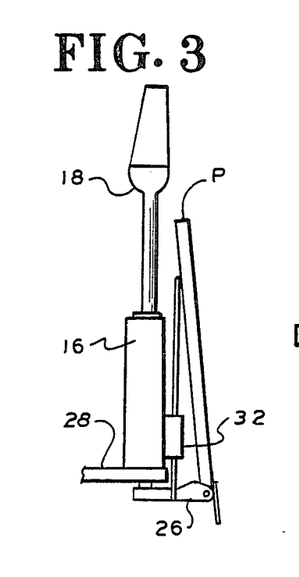
FIG. 3 is a side view of the carrier of FIG. 2 with its platform folded.

Referring to FIG. 3, jackscrew 18 is shown fully retracted to lift crossbar 26 and platform P. When in this position, platform P can be folded upwardly so that it does not project outwardly to present an obstruction during conventional driving conditions.

Figures 4, 5:
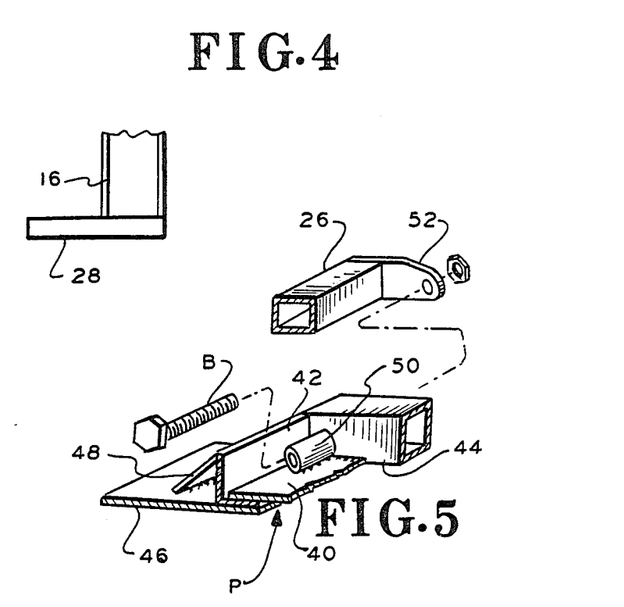
FIG. 4 is a detailed view of the joint between the frame and square tube of the carrier of FIG. 2.
FIG. 5 is a detailed perspective view of a hinge joint of the platform of FIG. 2.

Referring to FIG. 4, the underside of frame 16 is revealed as a channel that is there welded to square tube 28.

Referring to FIG. 5, the right hinge point of the platform P is illustrated in an exploded view. The inner edge of platform P is formed of angle iron 42 which is welded to a side piece in the form of square tube 44. The underside of iron 42 has welded to it an inwardly projecting apron 46. Apron 46 bears against crossbar 26 to limit the of rotation of platform P. A metal bracing strip 48 is shown welded at an angle at the joint of iron 42 and apron 46, for reinforcing purposes. A bushing 50 is shown welded into the corner made by angle iron 42 and square tube 44. The tube 44 is drilled so that bolt B can be inserted through bushing 50 to pass through the aperture in side plate 52 welded at the end of crossbar 26.

Figure 6:
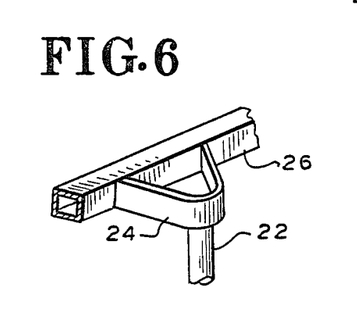
FIG. 6 is a perspective view of the underside of the joint between the jackscrew and the crossbar of FIG. 2.

Referring to FIG. 6, the central portion of crossbar 26 is shown having welded to it a hollow boss 24 formed of sheet metal. The lower telescoping rod 22 of the jackscrew is shown welded to boss 24. Being built in this fashion a high degree of rigidity is achieved between rod 22 and crossbar 26.

Figure 7:
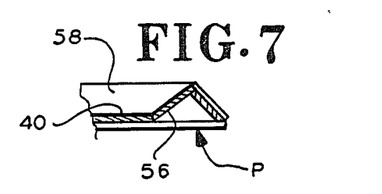
FIG. 7 is a cross-sectional view along line 7—7 of FIG. 2.

Referring to FIG. 7, the left edge of platform P is shown formed by an angle iron 56, positioned with its angle up to provide a ramp for a conveyance. Angle iron 56 is shown welded at its end to the inside of the outermost angle iron 58, which forms the outer edge of the platform P.

Figure 8:
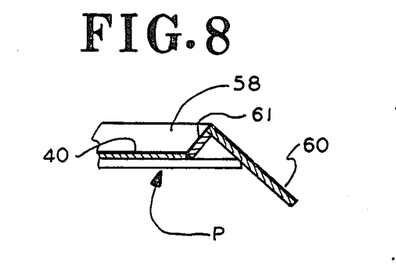
FIG. 8 is a cross-sectional view of the entry point of a platform ramp, which entry point is an alternate to that of FIG. 7.

An alternate ramping may be achieved as shown in FIG. 8 wherein angle iron 58 has welded to it an apron plate 60 at an angle of 45° to the length of iron 58. A reinforcing plate 61 is welded perpendicularly to plate 60 and obliquely to iron 58. This configuration allows easy ramping onto the platform P.

Figure 9:
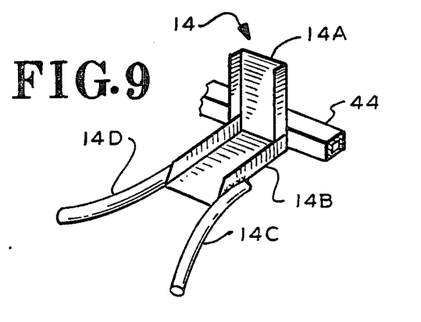
FIG. 9 shows an attachment which may be used with the holder of FIG. 2.

Referring to FIG. 9, the holder of FIG. 2 is shown herein comprising a vertical channel 14A and horizontal channel 14B welded at the same longitudinal station along square tube 44. In the embodiment of Fig. 9 additional guides are shown in the form of bent pipes 14C and 14D that are welded to the inner end of channel 14B. Because pipes 14C and 14D flare away as shown, they serve to guide the front wheel of a conveyance into the holder 14.

Figures 10A, 10B, 11:
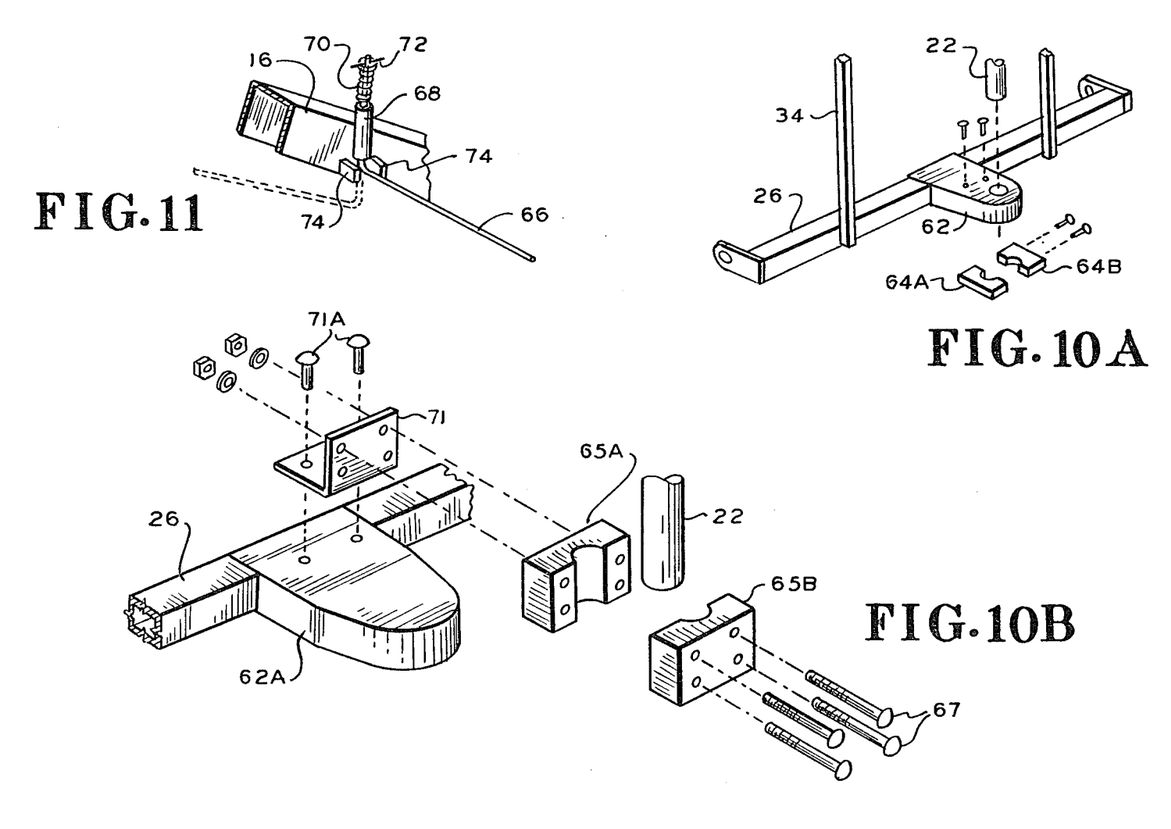
FIG. 10A is a perspective view of the crossbar of FIG. 2, modified to allow easy disconnecting of the end of the jackscrew.
FIG. 10B is a perspective view of an easily disconnectable crossbar which is an alternate to that of FIG. 10A.
FIG. 11 shows a lever which may be mounted onto the frame of the carrier of FIG. 2 as an accessory.

Referring to FIG. 10A, the previously mentioned crossbar 26 is shown outfitted with a different hollow boss 62. Boss 62 is welded centrally onto crossbar 26. However, the telescoping rod 22 of the jackscrew is not welded to boss 62. Instead, end 22 is inserted through the aperture illustrated to be embraced by a split clamp 64A and 64B. Clamps 64A and 64B are rectangular blocks having semi-circular recesses sized to seize the rod 22 of the jackscrew. By bolting clamps 64A and 64B together, a strong union is made to the jackscrew rod 22. Thereafter, the blocks 64A and 64B can be bolted onto the boss 62 to form a strong joint between jackscrew rod 22 and crossbar 26. The advantage with this configuration over welding is apparent: the ease of replacement of the jackscrew.

Referring to FIG. 10B, previously mentioned tube 26 is fitted with alternate boss 62A, not having a large aperture to receive jackscrew rod 22. Instead split blocks 65A and 65B (shaped similarly to blocks 64A and 64B of FIG. 10A) are clamped about the lower end of rod 22 by bolts 67. Bolts 67 also secure the outside face of block 65A to the vertical flange of bracket 71 whose horizontal flange is bolted to boss 62A by bolts 71A. Accordingly rod 22 is disconnectably secured to boss 62A but without the need for a hole in boss 62A.

Referring to FIG. 11, the previously mentioned frame 16 is shown with a tubular bearing sleeve 68 welded to a right front face of the frame. The inside end of lever 66 is bent at right angles to the main length of the lever and is inserted up through bearing sleeve 68. The inner end of lever 66 emerging above sleeve 68 is encircled by compression spring 70 which is held down on lever 66 by a washer/cotter pin 72. The bend of lever 66 is shown embraced by a guard fork in the form of parallel bosses 74 welded on frame 16. In this position, the outer end of lever 66 projects at approximately a right angle to frame 16. To retract lever 66 to the position illustrated in phantom, lever 66 can be pressed downwardly and rotated to the phantom position.

Spring 70 compresses to allow the depression of lever 66.

Figures 12, 13:
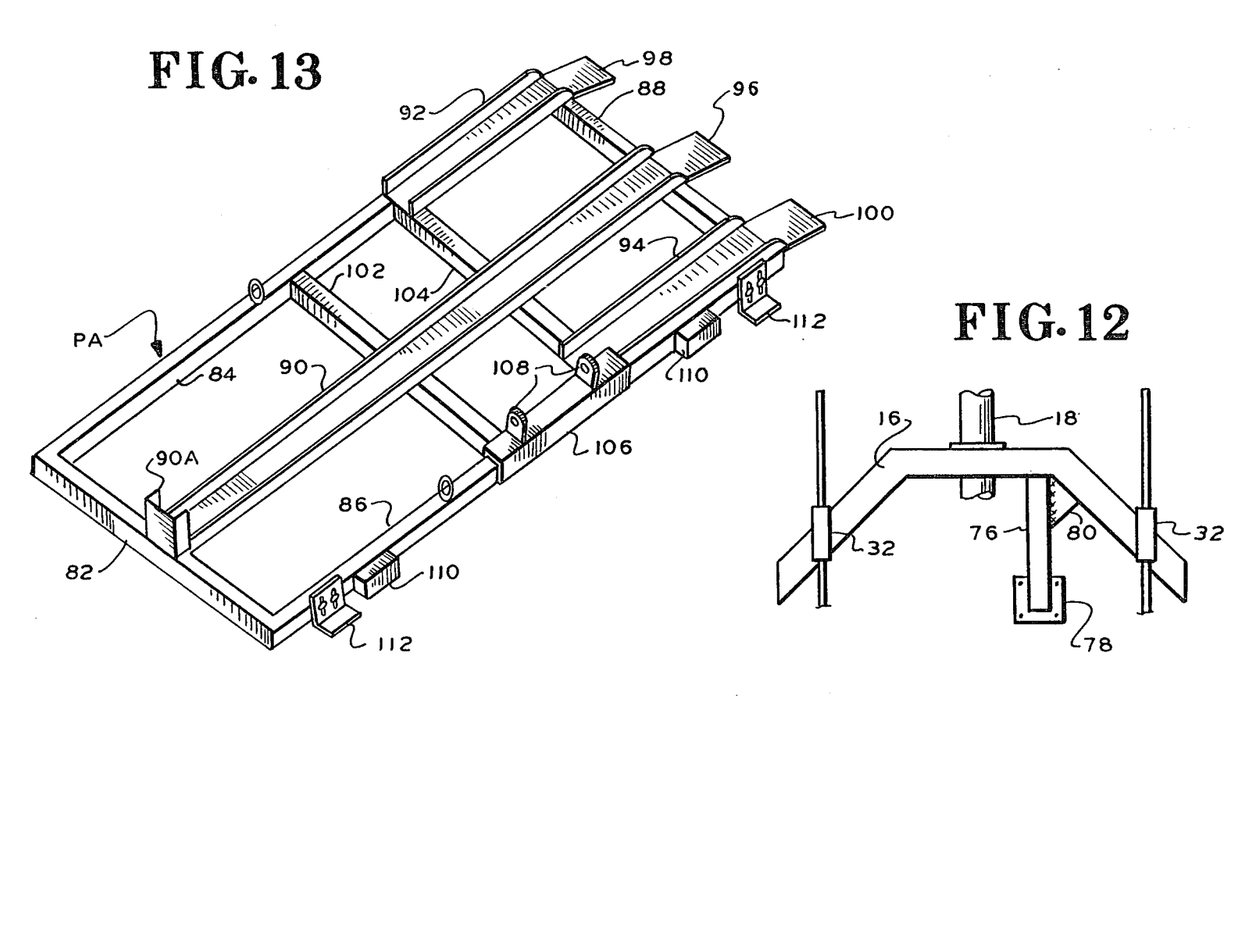
FIG. 12 is an elevational view of a frame similar to that of FIG. 2 but modified to have a single point of attachment to the vehicle.
FIG. 13 is a perspective view of a platform which is an alternate to that of FIG. 2.

Referring to FIG. 12, previously illustrated frame 16 is shown again with guides 32 and jackscrew 18. In this embodiment, however, a single point of attachment is contemplated. To this end, vertical square tube 76 is shown projecting downwardly from between the flanges of frame 16 before making a right turn to terminate in a flange 78. Flange 78 is of a conventional design for bolting to a standard hitch that may be bolted onto a vehicle frame. Tube 76 is welded to frame 16 with gusset plate 80 welded between tube 76 and frame 16. It is significant to note that tube 76 is not mounted centrally but is offset. This feature contemplates the fact that a typical conveyance for the handicapped will have most of its weight centered towards the rear of the conveyance, where the motor and seat are located. Accordingly, tube 76 can be centered near this expected center of gravity to avoid an excessive bending moment on flange 78. It will be further understood that for some embodiments the vertical portion of tube 76 can be replaced by an angle iron welded between frame 16 and a receiver.

Referring to FIG. 13, an alternate platform PA is illustrated. Platform PA is a rack formed of square tubes 82, 84, 86 and 88 forming a rectangular plan. A first channel 90 is shown spanning between tubes 82 and 88. The left end (in this view) of channel 90 terminates at an upright channel 90A acting as a stop for a vehicle wheel. A second and third channel 92 and 94 are shown spanning approximately one third of the length of tubes 84 and 86, respectively. Channels 92 and 94 are designed to hold the rear wheels of a conveyance for the handicapped. Each of the channels 90, 92, and 94 have at their right end, ramps 96, 98 and 100, respectively, formed of sheet steel to allow simple rolling of the conveyance onto platform PA. Reinforcing tubes 102 and 104 are shown spanning transversely between tubes 84 and 86. The inside ends of tubes 102 and 104 are shown covered by an angle iron 106 having a pair of bearing tabs 108 to form a hinge point. Tube 86 has mounted on it, a pair of stabilizing blocks 110 in the form of rectangular steel tabs. Also mounted thereon is another stabilizing device in the form of a pair of brackets 112, shown with their vertical faces slotted to allow vertical repositioning of brackets 112. In this embodiment, brackets 112 are designed to fit under the bumper of an automobile so that platform PA does not rock along a rolling axis.

Figures 14, 15:
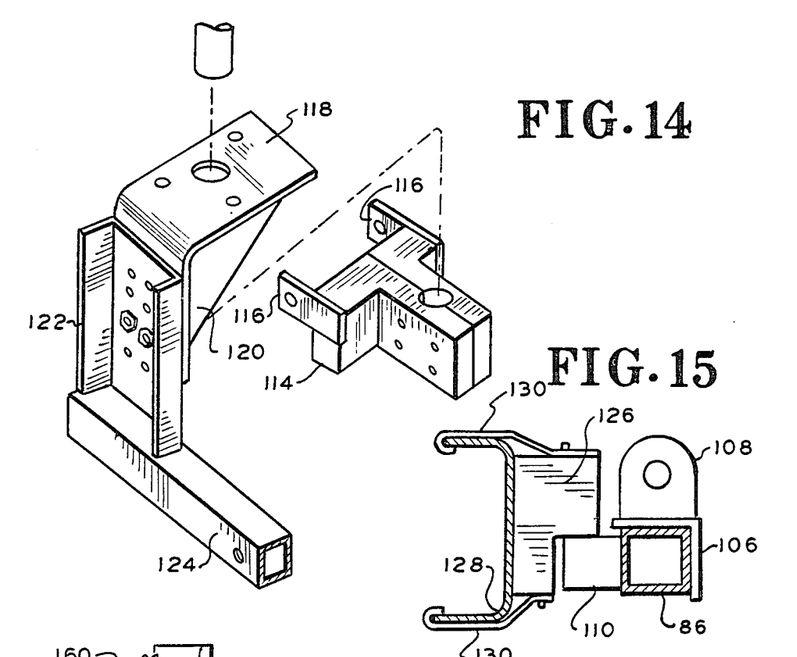
FIG. 14 is a detail of the frame to platform hinge which may cooperate with the platform of FIG. 13.
FIG. 15 is a side view of the hingeing and stops used in connection with the platform of FIG. 13.

The hinge connection of the foregoing apparatus may be understood by referring to FIG. 14 showing another split clamp 114 formed of "L" shaped members each having a semi-circular cutout sized to securely hold the end 22 of the jackscrew. The split clamp 114 has outwardly projecting therefrom a pair of tabs 116 apertured to form a hinging point. The spacing between tabs 116 is designed to match the spacing of the previously mentioned hinge tabs (tabs 108 of FIG. 13). As before split clamp 114 can be bolted together to seize end 22. It will be noticed herein that the jackscrew will be attached to the horizontal face of an angle bracket 118. Bracket 118 includes reinforcing gusset plates 120 to prevent bending. The vertical face of angle bracket 118 is bolted to a channel 122 having a plurality of holes to allow vertical repositioning of bracket 118. The lower end of channel 122 is welded to square tube 124 designed to be inserted into the socket of a conventional hitch.

Referring to FIG. 15, previously mentioned hinge tab 108 is shown with its supporting iron 106, square tube 86 and stabilizing tab 110. In this normal working relationship tab 110 is shown fitting into the notch of a stabilizing block 126. Block 126 is shown clipped to a rear bumper 128 by hooks 130. The interaction between tab 110 and block 126 is twofold: Such engagement limits the amount of rotation about tab 108. Furthermore, for this embodiment where single point support is contemplated, tabs 110 prevent rocking of the platform along a roll axis.

Figure 16:
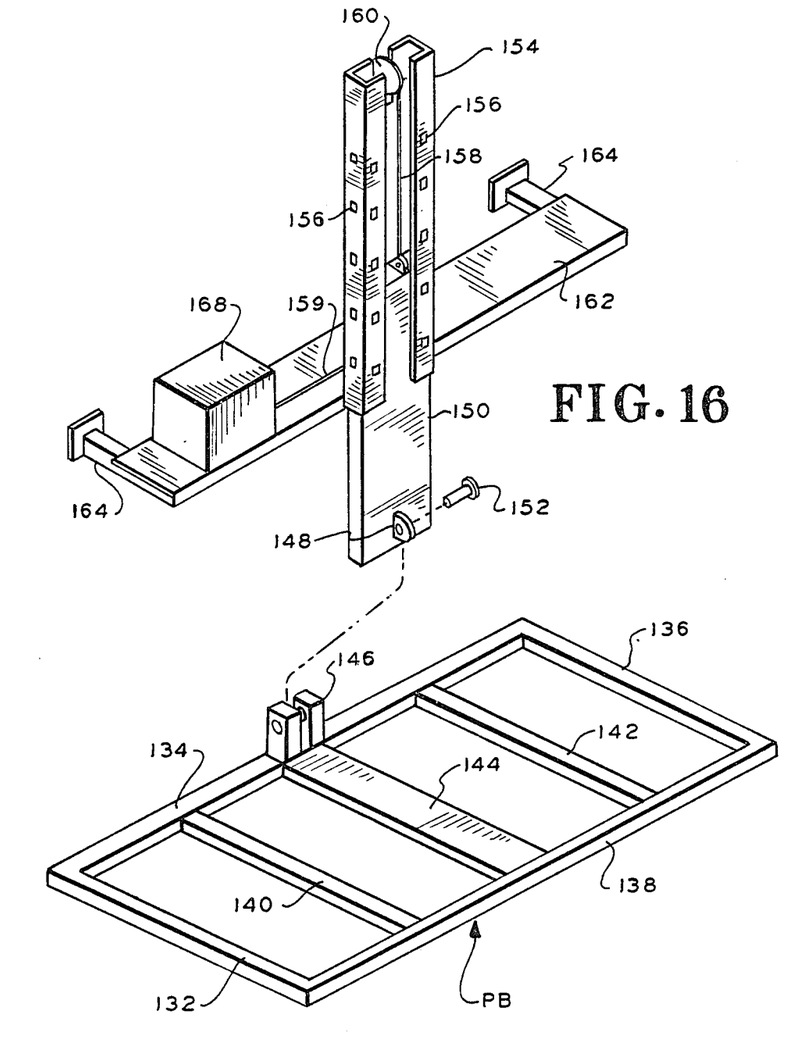
FIG. 16 is a perspective view of a carrier which is an alternate to that of FIG. 2.

Referring to FIG. 16, an alternate platform PB is shown formed of square tubes 132, 134, 136, and 138 formed into a rectangular frame. A pair of reinforcing, transverse braces 140 and 142 are shown spanning between tubes 134 and 138. Also an inverted channel 144 is shown spanning between tubes 134 and 138 at a central location. Centrally on tube 134 there is shown a pair of apertured bosses 146 acting as a hinge point. An apertured boss 148 on the end of a slider 150 can be connected by means of pin 152 to the bosses 146 to effect a hinge. Slider 150 is shown slidably mounted in a vertical sleeve 154. Sleeve 154 is a rectangular channel with an open front. As described hereinafter in further detail, rollers 156 are mounted around sleeve 154 to guide slider 150. A chain 158 is shown supporting slider 150. Chain 158 is routed over a wheel 160 to direct the chain 158 along both sides of the inner face of sleeve 154.

Sleeve 154 is shown attached to a crossbar 162, in the form of an angle iron. On the underside of crossbar 162 a pair of horizontal rods 164 in the form of square tubes, are employed as a hitch to a vehicle.

Figures 17, 18:
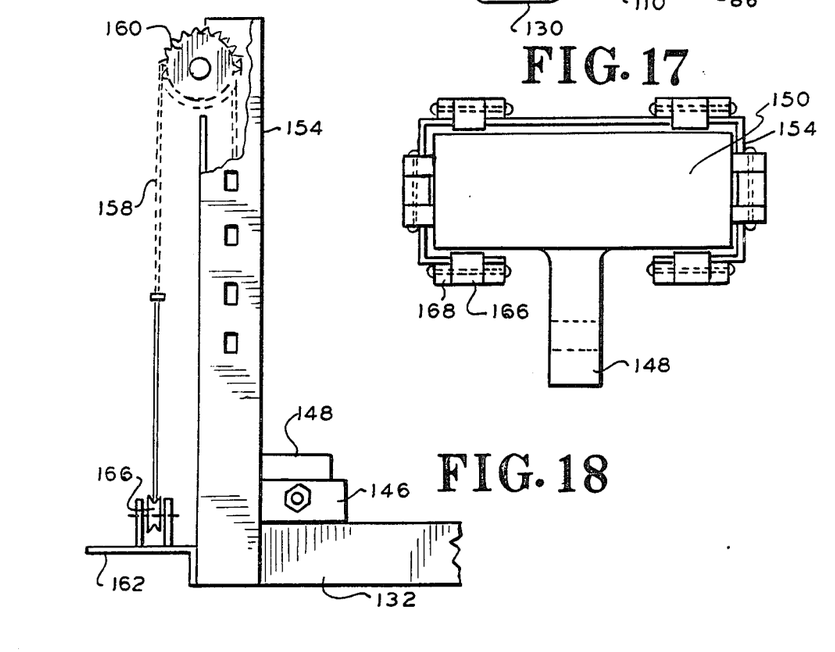
FIG. 17 is a cross sectional view of the slider and sleeve of FIG. 16.
FIG. 18 is a side view of a portion of the carrier of FIG. 16.

Referring to FIG. 17, previously illustrated slider 150 is shown with sleeve 154. Sleeve 154 has previously mentioned rollers in the form of collar 166 journaled on bearings 168 welded to sleeve 154. Slider 150 is therefore supported by rollers on all four sides.

Referring to FIG. 18 sleeve 154 is illustrated with an upper portion broken away to clearly reveal wheel 160. Wheel 160 is in this embodiment a gear designed to cooperate with chain 158 in the form of a roller chain. Chain 158 is tied to a cable 159 which is routed over another wheel 166, so that cable 159 now travels parallel to channel 162.

Referring again to FIG. 16 cable 159 is shown feeding to a winch means 168. Winch means 168 may be a simple motor-driven capstan that takes up line 159 to lift slider 150.

Figures 19, 20:
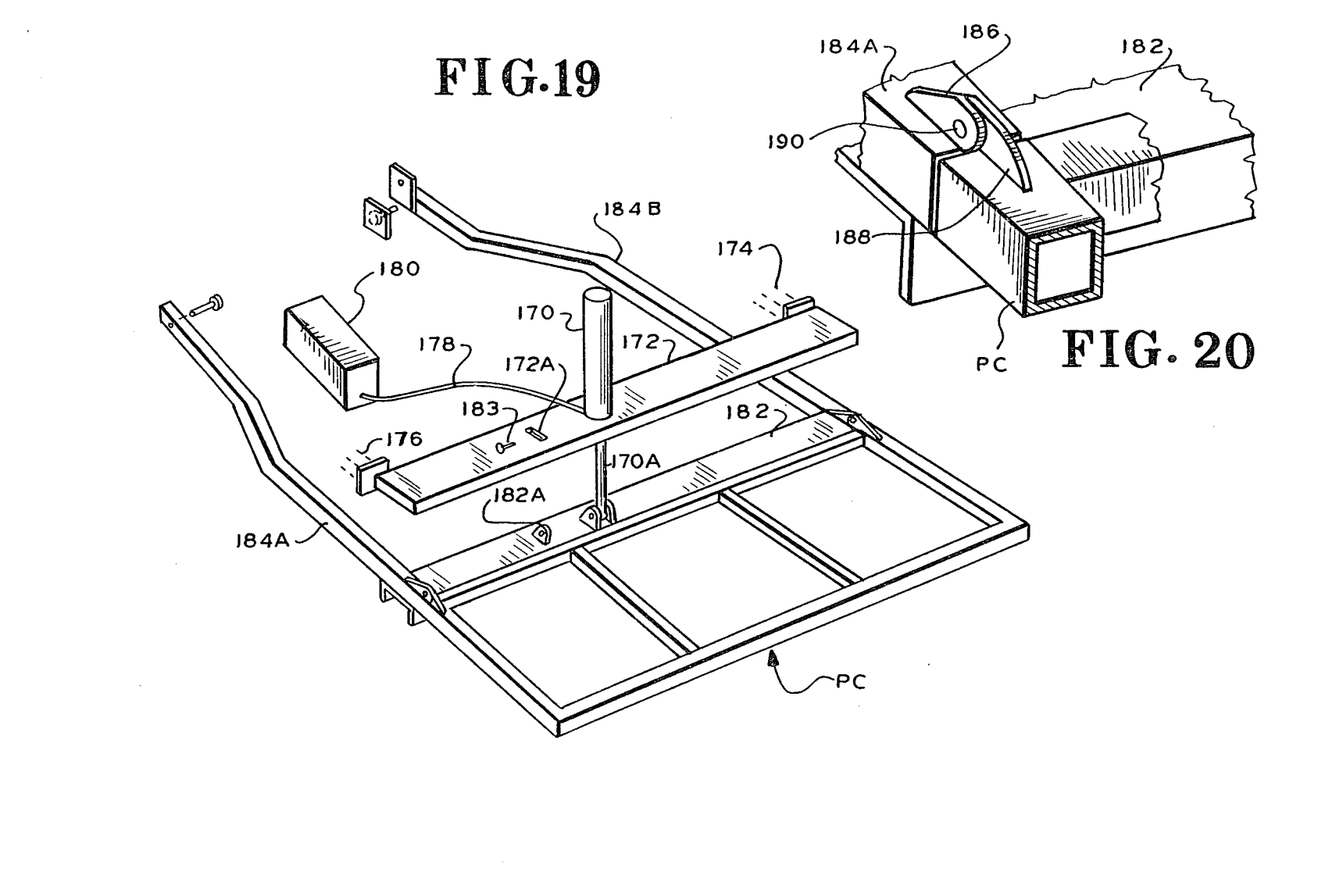
FIG. 19 is a perspective view of a carrier which is an alternate to that of FIG. 2.
FIG. 20 is a detailed perspective view of the hinge point for the carrier of FIG. 19.

Referring to FIG. 19, it shows an alternate carrier employing a hydraulic piston 170 having a lower rod 170A. Piston 170 is shown mounted on a crossbar 172 which may be mounted in a manner similar to that previously shown to hitches 174, 176, illustrated in phantom. Hydraulic cylinder 170 is shown connected by line 178 to hydraulic pump 180.

The lower end of rod 170A is shown pivotally connected to lower crossbar 182. Crossbar 182 may be an inverted channel having welded to either of its ends a pair of supporting arms 184A and 184B. Arms 184A and B extend to the underside of a vehicle to be pivotally connected thereto. Accordingly, arms 184A and 184B can rotate together with crossbar 182. Hinged to crossbar 182 is platform PC, again formed of square tube spanned by reinforcing braces. When arms 184A and 184B bring crossbar 182 against crossbar 172, eyelet 182 welded on crossbar 182 protrudes through slot 172A.

Accordingly, safety pin 183 can be placed into eyelet 182A, thereby holding crossbar 182 in the up position.

Referring to FIG. 20, the hinging of platform PC is shown in detail for the arm 184A. Arm 184A has on it a boss 186. Corresponding boss 188 is affixed to the corner of platform PC. With hinge pin 190 connecting bosses 186 and 188, platform PC can turn about pin 190 to rotate with respect to arm 184A.

Being constructed in this fashion the apparatus of FIG. 19 can be operated by energizing piston 170 through pump 180. Consequently, crossbars 182 and 172 are drawn together. Since crossbar 172 is fixed with respect to the vehicle, crossbar 182 moves relatively upwardly. Because of the stabilizing influence of arms 184A and 184B, crossbar 182 moves smoothly and levelly. When raised fully, platform PC can be rotated upwardly for storage.

Figure 21:
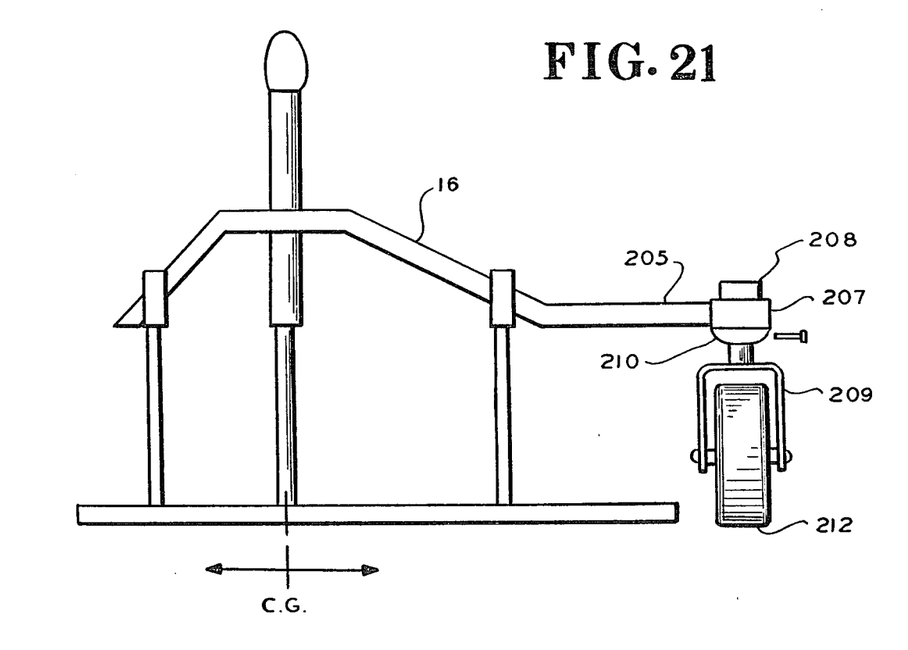
FIG. 21 is an elevational view of a carrier which is an alternate to that of FIG. 2.
Figure 22:
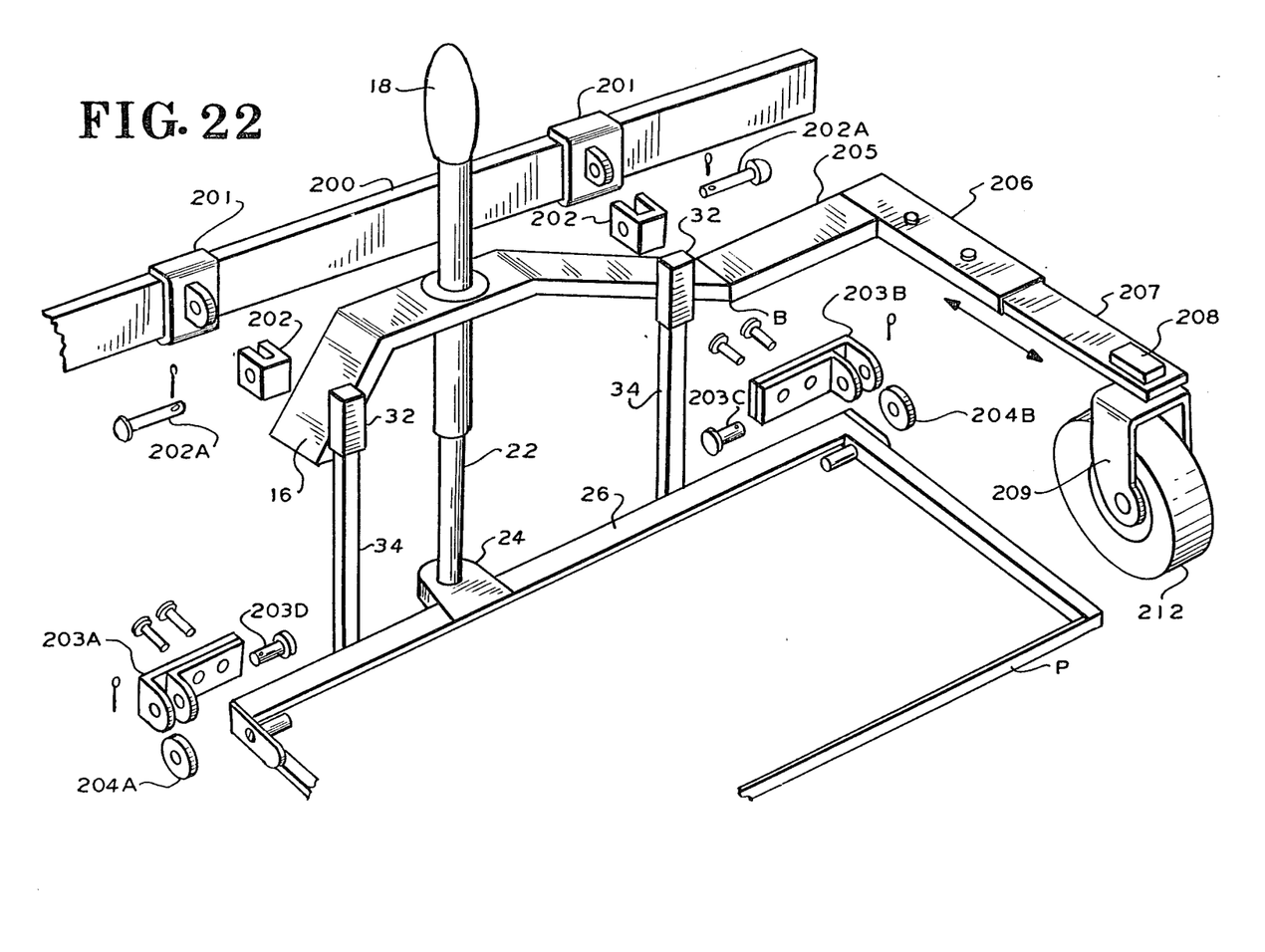
FIG. 22 is an exploded perspective view of the carrier of FIG. 21.

Referring to FIGS. 21 and 22, they show a mounting scheme for a bumper 200 which may not be sufficiently sturdy to withstand the bending moment caused by the mounting of the equipment thus far described. Accordingly, support means is provided to prevent excessive loading of bumper 200. In this embodiment, bumper 200 has attached to it at spaced positions lugged brackets 201. These are bolted, mounted or otherwise secured to bumper 200 so that the illustrated lugs project rearwardly. Welded to the forward side of previously mentioned frame 16 are a pair of clevises 202 to engage lugs on brackets 201. Clevises 202 and lugged bracket 201 are held together with clevis pins 202A.

The right hand end of frame 16 is welded to a horizontal channel 205. Welded perpendicularly to the end of member 205 is a rearwardly projecting pair of telescoping arms 206 and 207. Outer arm 207 can telescope into arm 206. The end of arm 207 has attached to it an azimuthally pivotable fork 209 that has rotatably mounted between its tines, wheel 212. The fork 209 pivots about the end of arm 207 but is damped by shimmy damper 208.

Previously described lift mechanism 18, 22 is attached to the platform through members 24 and 26, as described before. The outer ends of beam 26 have bolted to it journal brackets 203A and 203B. Each of the journal brackets 203A and 203B is formed from a pair of L-shaped members whose outer ends are apertured to provide a mounting location for the dolly wheels 204A and 204B, respectively. Wheels 204A and 204B are supported by axle pins 203D and 203C, respectively.

In operation, platform P is raised and lowered in the usual fashion by jackscrew 18. It will be noted that frame 16 is mounted to pivot or pitch about the clevises 202. This tendency to pitch, however, is limited by wheel 212 which tends to keep platform P horizontal as it is raised by jackscrew 18.

The platform when completely lowered does not directly contact the ground along its forward edge but is supported by dolly wheels 204A. This prevents damage to the platform, especially when it may be moved longitudinally by small amounts of motion of the vehicle to which this apparatus is attached. Also since frame 16 can pivot around clevises 202, such motion is accommodated by dolly wheels 204A and 204B.

When no handicapped conveyance is being stored on platform P, it may be raised in the aforementioned manner by jackscrew 18. Once platform P is raised it can be folded upwardly as before. Also at this time, the arm 207 can be telescoped into arm 206 so that wheel 212 is compactly folded near to the vehicle. In some embodiments, the frame 16 can be tilted by a chain or other device to lift the wheel 212 so it does not tend to contact the road.

To facilitate an understanding for the principles associated with the foregoing apparatus its operation will now be briefly described in connection with FIGS. 1–7. It will be appreciated that the structure for the other Figures operate similarly. The jackscrew 18 (FIG. 2) is driven by electrical energy that may be supplied from an automobile battery. The operator initially will energize jackscrew 18 to thrust the telescoping rod 22 downwardly. Consequently, crossbar 26 and platform P will reach the ground as shown. At this time, a handicapped person can roll or drive a conveyance onto platform P as shown in FIG. 1. Once the conveyance is in position, the handicapped person can disembark and depress the upper switch on jackscrew 18. Jackscrew 18 consequently retracts its rod 22 (FIG. 2). Therefore, crossbar 26 and platform P rise. When platform P is fully lifted, the switch on jackscrew 18 can be released.

The conveyance can be held securely in place by safety chain 38. Alternatively, restraining lever 66 (FIG. 11) can be extended over the conveyance to keep it in place. When the conveyance is to be unloaded, the procedure is simply reversed.

The apparatus of FIG. 16 is operated similarly except that instead of a jackscrew, winch 168 is employed.

It is to be appreciated that various modifications may be implemented with respect to the above described preferred embodiments. For example, while angle irons and channels are used in some embodiments, solid stock, or other material may be employed instead. While the frame is shown in some embodiments as an inverted "V" shape, for some embodiments a shape such as a straight shape may be utilized. It will be further appreciated that the number of attachment points can be altered depending upon the weight of the conveyance and the required stability. While a jackscrew, hydraulic pump and winch are discussed, various other motorized devices can be used as well. Also the bed of the platform can be made of not only grates and channels but other panel materials, including sheet metal. The various hinges may be supplemented with bearings of known types to facilitate lifting of the platform. Also, the illustrated guides and uprights can differ in their placement and in the number of guides used. While generally, metal components are illustrated, in some embodiments, plastic, ceramic, and other components can be employed instead. Furthermore, the shape of the various illustrated components can be altered depending on the desired size, strength, structural rigidity, temperature stability, weight etc.

Obviously, many modifications and variations of the present invention are possible in light of the above teachings. It is, therefore, to be understood that within the scope of the appended claims, the invention may be practiced otherwise than as specifically described.

What is claimed is:

1. A carrier mountable on the rear of a vehicle having a rear bumper and for carrying a conveyance for handicapped persons, comprising:
    a frame adapted to be positioned at a height to vertically centralize said frame at said bumper and adapted to be attached to said vehicle;
    a platform slidably and hingeably attached to said frame, said platform being vertically positionable above the ground for storage;

a drive means coupled between said frame and platform for lifting said platform from a lowered to a raised position while keeping it horizontal, said drive means being sized to lift said platform with it loaded with said conveyance by applying a lifting force at substantially a single point on said platform to cause motion of said platform toward said frame;

a guide having a top and being mounted on said frame to keep said top at about the height of said bumper; said guide having a length less than the distance between said lowered and raised position;

an upright slidably mounted in said guide and coupled to said platform to guide it, said upright being sized to be above and below said guide when said platform is in said raised and lowered positions, respectively, so that easy access is maintained over said bumper; and a pair of spaced dolly wheels rotatably attached to opposite sides of said platform.

2. A carrier according to claim 1 wherein said drive means comprises:
a jackscrew having an extendible tube; and
a drive motor coupled to said jackscrew for extending and retracting said extendible tube.

3. A carrier according to claim 2 comprising:
a pair of spaced guides mounted on said frame on either side of said jackscrew; and
a pair of uprights each slidably mounted in a corresponding one of said guides, each upright being coupled to said platform to guide it.

4. A carrier according to claim 3 wherein said platform includes:
a crossbar attached to said jackscrew, said uprights being attached to and extending upwardly from said crossbar.

5. A carrier according to claim 4 wherein said vehicle has a receiver and wherein said frame comprises:
a beam for supporting said jackscrew; and
a horizontal rod attached to said beam and sized to slide into and be supported by said receiver.

6. A carrier according to claim 4 wherein said vehicle has a pair of receivers and wherein said frame comprises:
a beam having an inverted "V" shape for supporting said jackscrew; and
a pair of horizontally spaced rods attached to said beam and each sized to slide into and be supported by a corresponding one of said receivers.

7. A carrier according to claim 2 wherein said vehicle has a receiver and wherein said frame further comprises:
a beam for supporting said jackscrew; and
a horizontal rod attached to said beam and sized to slide into and be supported by said receiver.
a split clamp sized to clamp around said jackscrew; and
a pair of apertured tabs attached to said split clamp and hingeably attached to said platform.

8. A carrier according to claim 2 wherein said platform is mounted with its length transverse to said vehicle, and wherein said conveyance has wheels, said carrier further comprising:
a holder mounted on said platform at one end thereof and sized to hold a front wheel of said conveyance.

9. A carrier according to claim 1 further comprising:
a vertical sleeve mounted on said frame; and
a slider slidably mounted in said sleeve and hingeably attached to said platform.

10. A carrier according to claim 9 further comprising:
a line connected to the top of said slider; and
a winch means for pulling said line to lift said slider.

11. A carrier according to claim 10 further comprising:
a wheel rotatably mounted atop said sleeve for guiding said line so that a downward pull on said line lifts said slider.

12. A carrier according to claim 11 wherein said slider has on its lower end;
an apertured boss hingeably attached to said platform.

13. A carrier according to claim 12 further comprising:
a plurality of spaced rollers journalled on said sleeve to bear against said slider.

14. A carrier according to claim 2 wherein said vehicle has a receiver and wherein said frame comprises:
a beam for supporting said jackscrew; and
a horizontal rod attached to said beam and sized to slide into and be supported by said receiver.

15. A carrier according to claim 14 further comprising:
a stabilizing block adapted to be mounted on the rear of said vehicle;
a stabilizing tab mounted on said platform to rotate therewith, said tab being sized to engage said stabilizing block when said platform is positioned horizontally, so that rotation of said platform about a roll axis is restricted.

16. A carrier according to claim 15 wherein said stabilizing block has a lower notch.

17. A carrier according to claim 14 wherein said horizontal rod is transversely spaced from the geometric center of said beam so that a non-symetrical load on said platform can be balanced with respect to said horizontal rod.

18. A carrier according to claim 2 wherein said platform comprises:
a rack;
a first channel mounted atop said rack and running centrally the length thereof; and
second and third channels mounted on either side of and parallel to said first channel, said second and third channels being shorter than said first channel.

19. A carrier according to claim 1 further comprising:
a lever rotatably mounted on said frame for extending over said conveyance to hold it in place.

20. A carrier according to claim 19 further comprising:
a bearing attached to said frame for rotatably supporting said lever;
a bias means for urging said lever into said bearing;
a guard fork mounted on said frame adjacent to said bearing for holding said lever in its extended position, said lever being operable to slide outwardly in said bearing to disengage said fork and move into a stored position against said frame.

21. A carrier according to claim 1 wherein said drive means comprises:
a hydraulic piston connected between said frame and platform for lifting the latter.

22. A carrier according to claim 21 further comprising:
a crossbar attached to said hydraulic piston and hingeably attached to said platform;

a pair of spaced arms each mounted between said crossbar and the underside of said vehicle to pivot with respect to said vehicle.

23. A carrier according to claim 1 further comprising:
a boom rearwardly projecting from and attached to said frame; and
a support wheel rotatably attached below the outer end of said boom.

24. A carrier mountable on the rear of a vehicle having a rear bumper and for carrying a conveyance for handicapped persons, comprising:
a frame adapted to be positioned at a height to vertically centralize said frame at said bumper and adapted to be attached to said vehicle;
a platform slidably and hingeably attached to said frame, said platform being vertically positionable above the ground for storage;
a drive means coupled between said frame and platform for lifting said platform from a lowered to a raised position while keeping it horizontal, said drive means being sized to lift said platform with it loaded with said conveyance by applying a lifting force at substantially a single point on said platform to cause motion of said platform toward said frame;
a guide having a top and being mounted on said frame to keep said top at about the height of said bumper; said guide having a length less than the distance between said lowered and raised position;
an upright slidably mounted in said guide and coupled to said platform to guide it, said upright being sized to be above and below said guide when said platform is in said raised and lowered positions, respectively, so that easy access is maintained over said bumper;
a lever rotatably mounted on said frame for extending over said conveyance to hold it in place;
a bearing attached to said frame for rotatably supporting said lever;
a bias means for urging said lever into said bearing; and
a guard fork mounted on said frame adjacent to said bearing for holding said lever in its extended position, said lever being operable to slide outwardly in said bearing to disengage said fork and move into a stored position against said frame.

25. A carrier mountable on the rear of a vehicle having a rear bumper and for carrying a conveyance for handicapped persons, comprising:
a frame adapted to be positioned at a height to vertically centralize said frame at said bumper and adapted to be attached to said vehicle;
a platform slidably and hingeably attached to said frame, said platform being vertically positionable above the ground for storage;
a drive means coupled between said frame and platform for lifting said platform from a lowered to a raised position while keeping it horizontal, said drive means being sized to lift said platform with it loaded with said conveyance by applying a lifting force at substantially a single point on said platform to cause motion of said platform toward said frame;
a guide having a top and being mounted on said frame to keep said top at about the height of said bumper; said guide having a length less than the distance between said lowered and raised position;
an upright slidably mounted in said guide and coupled to said platform to guide it, said upright being sized to be above and below said guide when said platform is in said raised and lowered positions, respectively, so that easy access is maintained over said bumper;
a boom rearwardly projecting from and attached to said frame; and
a support wheel rotatably attached below the outer end of said boom.

* * * * *